(12) United States Patent
Sridhar et al.

(10) Patent No.: US 12,173,418 B2
(45) Date of Patent: Dec. 24, 2024

(54) SOEC INTEGRATION WITH ULTRA HOT STEAM

(71) Applicant: Bloom Energy Corporation, San Jose, CA (US)

(72) Inventors: K R Sridhar, San Jose, CA (US); David Weingaertner, San Jose, CA (US); Carlton Cottuli, San Jose, CA (US); Matthias Gottmann, San Jose, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 18/349,746

(22) Filed: Jul. 10, 2023

(65) Prior Publication Data

US 2024/0011173 A1    Jan. 11, 2024

Related U.S. Application Data

(60) Provisional application No. 63/359,647, filed on Jul. 8, 2022.

(51) Int. Cl.
  *C25B 1/04* (2021.01)
  *C25B 9/67* (2021.01)
  *C25B 15/021* (2021.01)

(52) U.S. Cl.
  CPC ............ *C25B 15/021* (2021.01); *C25B 9/67* (2021.01)

(58) Field of Classification Search
  CPC ............ C25B 1/04; C25B 9/67; C25B 15/021
  See application file for complete search history.

(56) References Cited

U.S. PATENT DOCUMENTS

| | | | |
|---|---|---|---|
| 2005/0164051 A1* | 7/2005 | Venkataraman | H01M 8/2432 429/495 |
| 2017/0175277 A1* | 6/2017 | von Olshausen | C25B 9/05 |
| 2022/0372636 A1 | 11/2022 | Weingaertner et al. | |
| 2023/0013942 A1 | 1/2023 | Weingaertner et al. | |
| 2023/0155214 A1 | 5/2023 | Weingaertner et al. | |
| 2023/0183874 A1 | 6/2023 | Weingaertner et al. | |
| 2023/0220576 A1 | 7/2023 | Bell et al. | |
| 2023/0220577 A1 | 7/2023 | Patel et al. | |
| 2023/0227991 A1 | 7/2023 | Saeedmanesh et al. | |
| 2023/0235466 A1 | 7/2023 | Bell et al. | |
| 2023/0287589 A1 | 9/2023 | Mermelstein et al. | |
| 2023/0323551 A1 | 10/2023 | Zargari et al. | |

FOREIGN PATENT DOCUMENTS

| | | | | |
|---|---|---|---|---|
| JP | 2020128576 | * | 8/2020 | ............... C25B 1/04 |

* cited by examiner

*Primary Examiner* — Zulmariam Mendez
(74) *Attorney, Agent, or Firm* — THE MARBURY LAW GROUP PLLC

(57) ABSTRACT

Systems, devices, and methods for electrolysis at very large scale (e.g., exceeding 100 megawatts (MW), and at gigawatt (GW) scale having a solid oxide electolyzer cell (SOEC) system including one or more SOEC columns, and one or more heat exchangers, each of the heat exchangers configured to receive input stream that is used to heat respective SOEC columns, wherein each of the heat exchangers is located along respective SOEC columns such that the input steam exiting the heat exchanger is directed towards adjacent SOEC columns.

15 Claims, 4 Drawing Sheets

200

SOEC INTEGRATION WITH ULTRA HOT STEAM

PRIORITY INFORMATION

This application claims the benefit of U.S. Provisional Patent Application No. 63/359,647 filed on Jul. 8, 2022, which is hereby incorporated by reference in its entirety.

BACKGROUND OF THE INVENTION

Field of the Invention

The embodiments of the present invention are generally directed to electrolyzer systems including a solid oxide electrolyzer cell (SOEC) and methods of operating the same.

Discussion of the Related Art

Solid oxide fuel cells (SOFC) can be operated as an electrolyzer in order to produce hydrogen and oxygen, referred to as solid oxide electrolyzer cells (SOEC). In SOFC mode, oxygen ions are transported from the cathode side (air) to the anode side (fuel) and the driving force is the chemical gradient of partial pressure of oxygen across the electrolyte. In SOEC mode, a positive potential is applied to the airside of the cell and oxygen ions are transported from the fuel side to the airside. Since the cathode and anode are reversed between SOFC and SOEC (i.e., SOFC cathode is SOEC anode, and SOFC anode is SOEC cathode), the SOFC cathode (SOEC anode) may be referred to as the air electrode, and the SOFC anode (SOEC cathode) may be referred to as the fuel electrode. During SOEC mode, water in the fuel stream is reduced ($H_2O+2e\rightarrow O^{2-}+H_2$) to form $H_2$ gas and $O^{2-}$ ions, $O^{2-}$ ions are transported through the solid electrolyte, and then oxidized on the air side ($O^{2-}$ to $O_2$) to produce molecular oxygen. Since the open circuit voltage for a SOFC operating with air and wet fuel (hydrogen, reformed natural gas) is on the order of 0.9 to 1V (depending on water content), the positive voltage applied to the air side electrode in SOEC mode raises the cell voltage up to typical operating voltages of 1.1 to 1.3V.

Currently, electrolyzers are designed using a modular approach, building up each set of stacks into approximately 100 kW modules. However, the inventors have developed systems, devices, and methods for electrolysis at very large scale (e.g., exceeding 100 megawatts (MW), and at gigawatt (GW) scale).

SUMMARY OF THE INVENTION

Accordingly, the embodiments of the present invention are directed to solid oxide electrolyzer cells (SOEC) integrated with ultra hot steam that substantially obviates one or more problems due to limitations and disadvantages of the related art.

Objects of the invention provide systems, devices, and methods for electrolysis at very large scale (e.g., exceeding 100 megawatts (MW), and at gigawatt (GW) scale).

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the drawings.

To achieve these and other advantages and in accordance with the purpose of the present invention, as embodied and broadly described, SOEC integration with ultra hot steam includes a solid oxide electolyzer cell (SOEC) system comprising one or more (e.g., a plurality) SOEC columns, and one or more (e.g., a plurality) of heat exchangers, each of the heat exchangers configured to receive input steam that is used to heat respective SOEC columns, wherein each of the heat exchangers is located along (e.g., in a vertical direction) respective SOEC columns such that the input steam exiting the heat exchanger is directed towards adjacent SOEC columns.

In another aspect, SOEC integration with ultra hot steam includes a method of operating a solid oxide electrolyzer cell (SOEC) system comprising providing one or more SOEC columns, and providing one or more heat exchangers, each of the heat exchangers configured to receive input steam that is used to heat respective SOEC columns, wherein each of the heat exchangers is located along respective SOEC columns such that the input steam exiting the heat exchanger is directed towards adjacent SOEC columns.

In the various embodiments, the SOEC system includes one or more electric trim heaters.

In the various embodiments, at least a subset of electric trim heaters are located at a peripheral location of a hotbox.

In the various embodiments, the input steam temperature is higher than the operating temperature of the SOEC columns.

In the various embodiments, the process steam is provided to respective SOEC columns using a low temperature header from a steam source.

In the various embodiments, the process steam is provided to respective SOEC columns using water that is vaporized by outputs of the respective heat exchangers.

In the various embodiments, the input steam has a temperature of approximately 950° C.

In the various embodiments, the input steam has a temperature that exceeds approximately 925° C.

In the various embodiments, the input steam is generated at a customer site of a hotbox.

In the various embodiments, the output steam of the heat exchangers is recycled.

It is to be understood that both the foregoing general description and the following detailed description are examples and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Reference will now be made in detail to the embodiments of the present invention, examples of which are illustrated in the accompanying drawing.

Figure 1A:
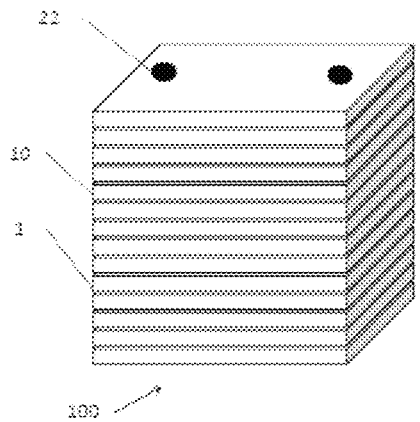
FIG. 1A is a perspective view of a solid oxide electrolyzer cell (SOEC) stack.
Figure 1B:
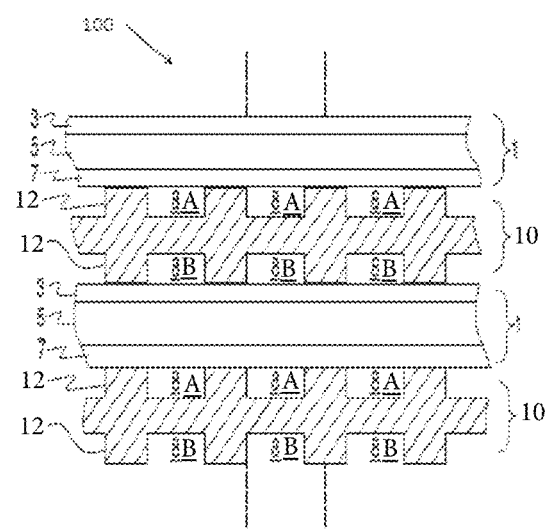
FIG. 1B is a side cross-sectional view of a portion of the stack of FIG. 1A.

FIG. 1A is a perspective view of a solid oxide electrolyzer cell (SOEC) stack 100, and FIG. 1B is a side cross-sectional view of a portion of the stack 100 of FIG. 1A. Referring to FIGS. 1A and 1B, the stack 100 includes multiple electrolyzer cells 1 that are separated by interconnects 10, which may also be referred to as gas flow separator plates or bipolar plates. Each electrolyzer cell 1 includes an air electrode 3, a solid oxide electrolyte 5, and a fuel electrode 7. The stack 100 also includes internal fuel riser channels 22.

Each interconnect 10 electrically connects adjacent electrolyzer cells 1 in the stack 100. In particular, an interconnect 10 may electrically connect the fuel electrode 7 of one electrolyzer cell 1 to the air electrode 3 of an adjacent electrolyzer cell 1. FIG. 1B shows that the lower electrolyzer cell 1 is located between two interconnects 10.

Each interconnect 10 includes ribs 12 that at least partially define fuel channels 8A and air channels 8B. The interconnect 10 may operate as a gas-fuel separator that separates the fuel/steam side of one fuel cell from the air side of an adjacent fuel cell (e.g., separating the flow of fuel to the fuel electrode 7 of one electrolyzer cell 1 in the stack 100 from air flowing to the air electrode 3 of an adjacent electrolyzer cell 1 in the stack 100). The optional air flow serves as a sweep gas to entrain the $O_2$ transported by electrolysis. At either end of the stack 100, there may be an air end plate or fuel end plate (not shown) for providing air or fuel, respectively, to the end electrode.

Figure 2:
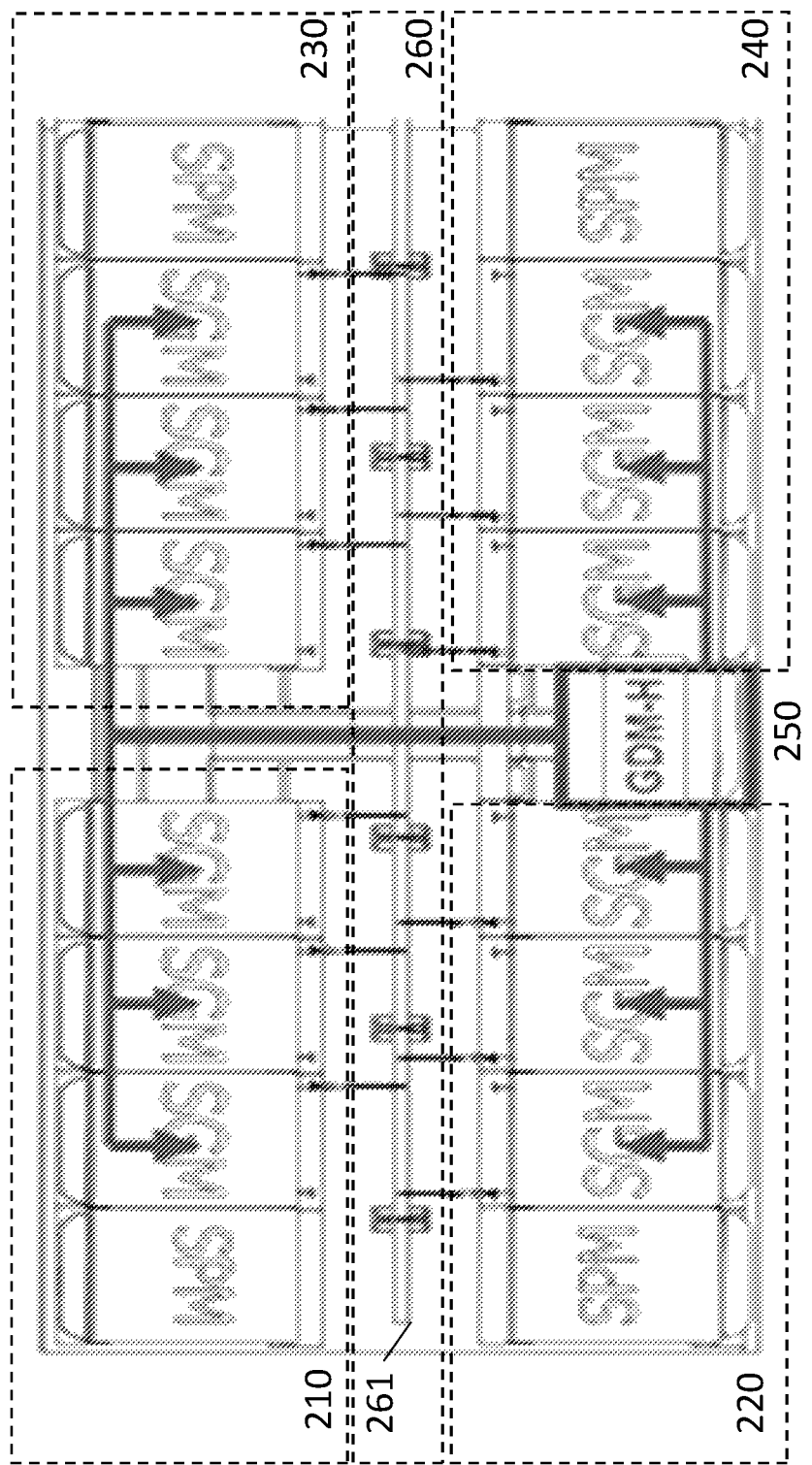
FIG. 2 illustrates an electrolyzer system.

FIG. 2 illustrates an electrolyzer system 200. The large-site electrolyzer system 200 includes a gas distribution module ("GDM") 250 that is configured to supply a plurality of modular blocks 210, 220, 230, 240 with startup hydrogen. SOEC systems generally require fresh hydrogen gas for startup and shutdown. Gas distribution module 250 can further include a hydrogen outlet, a pressure detector, a gas safety shutoff, and an optional purge gas distributor.

Each modular block incudes one power module ("SPM") and one or more generator modules ("SGM"), for example. A grouping of modular blocks into a collection of systems is referred to as a stamp. Thus, large site electrolyzer system 200 is a stamp. Because hydrogen is a flammable gas that is supplied to each SGM at pressure, a safe method of shutting off gas to a group of generator modules SGMs is needed if a safety event is detected. Thus, GDM 250 is configured to shut off hydrogen supplied to SGMs in the event that a safety event is detected. Safety designs, such as pressure detection, overpressure protection, and gas safety shutoff are readily applied within electrolyzer system 200 by GDM 250. In addition, a stamp level controller can be provided at GDM 250.

Although the grouping of four modular blocks 210, 220, 230, 240 is an exemplary configuration, this configuration is an efficient grouping for gas safety. In addition, the grouping of four modular blocks 210, 220, 230, 240 is efficient for the collection of hydrogen product within servicing aisle 260. The piping 261 within servicing aisle 260 is configured to collect hydrogen product for integration with a downstream compression system. Piping 261 is configured to prevent condensate backflow into the generator modules SGMs. Condensate management also enables using various monitoring and control devices as well as piping to return to the water outlet (or BOP1 of FIG. 4).

Although the grouping of four modular blocks 210, 220, 230, 440 as a stamp is shown, other numbers of modular blocks can form a stamp. Plumbing and electrical connections can be internal to respective modular blocks (or stamps) and/or integrated between modular blocks. Additionally, or alternatively, respective modular blocks 210, 220, 230, 240 may be configured to have external plumbing and electrical connections. Additionally, or alternatively, the location of GDM 250 can be varied relative to modular blocks 210, 220, 230, 240. For example, GDM 250 can be located between respective modular blocks or at a peripheral location (not shown).

Figure 3:
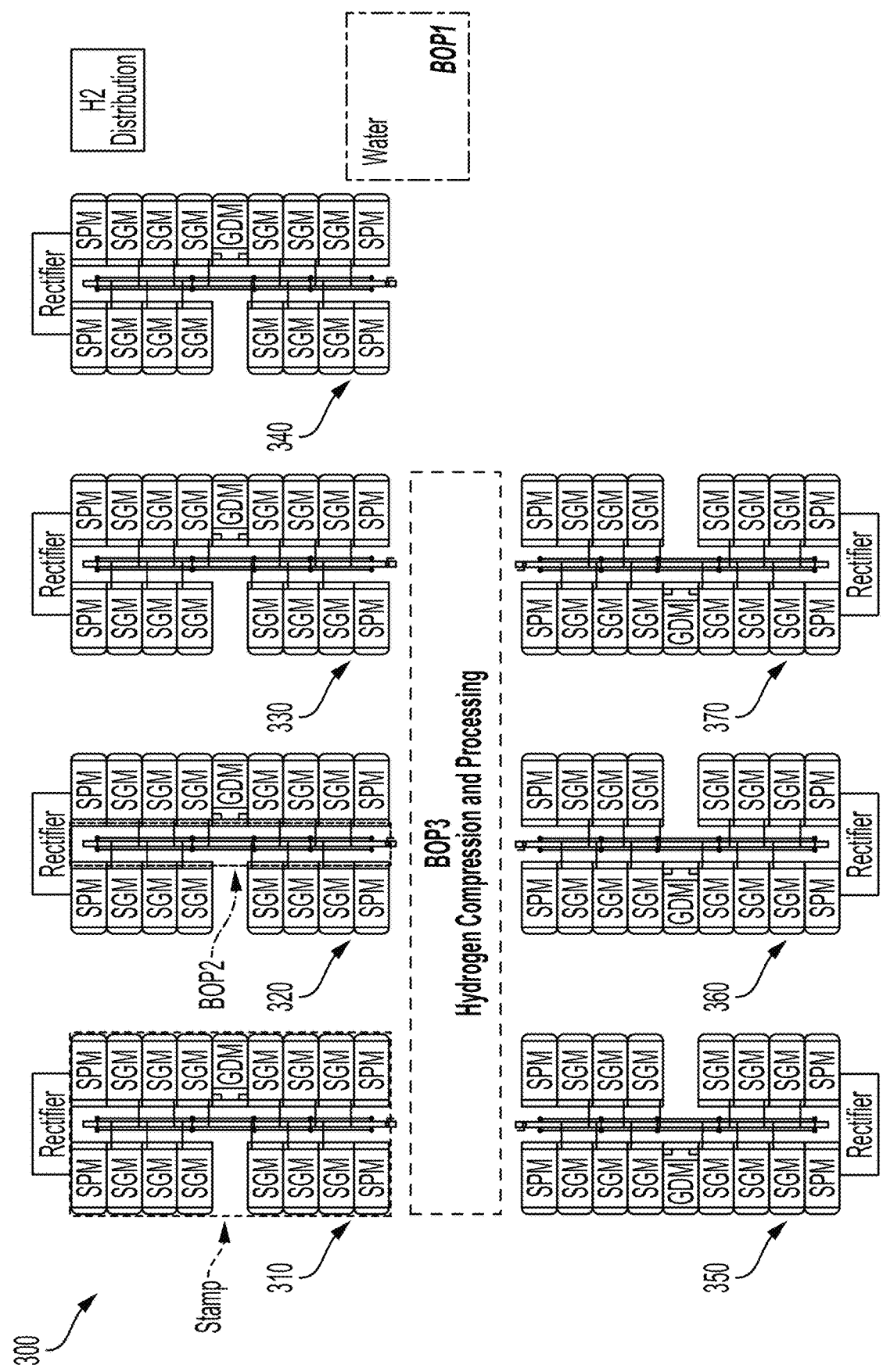
FIG. 3 illustrates another electrolyzer system.

FIG. 3 illustrates another electrolyzer system 300 (e.g., a 10-megawatt system). As illustrated in FIG. 3, electrolyzer system 300 includes a plurality of stamps 310, 320, 330, 340, 350, 360, and 370. In addition, electrolyzer system 300 further includes additional balance of plant components, such as water source BOP1, hydrogen product collectors BOP2 (e.g., including piping 261), and hydrogen compression and processing BOP3. Hydrogen compression and processing BOP3 is functionally configured to supply hydrogen at pressure to the gas distribution module (e.g., GDM 350) of each respective stamp 310, 320, 330, 340, 350, 360, and 370. Thus, the stamp architecture can be repeated in a large site layout, using the repeated elements to build up to a large site installation.

Figure 4:
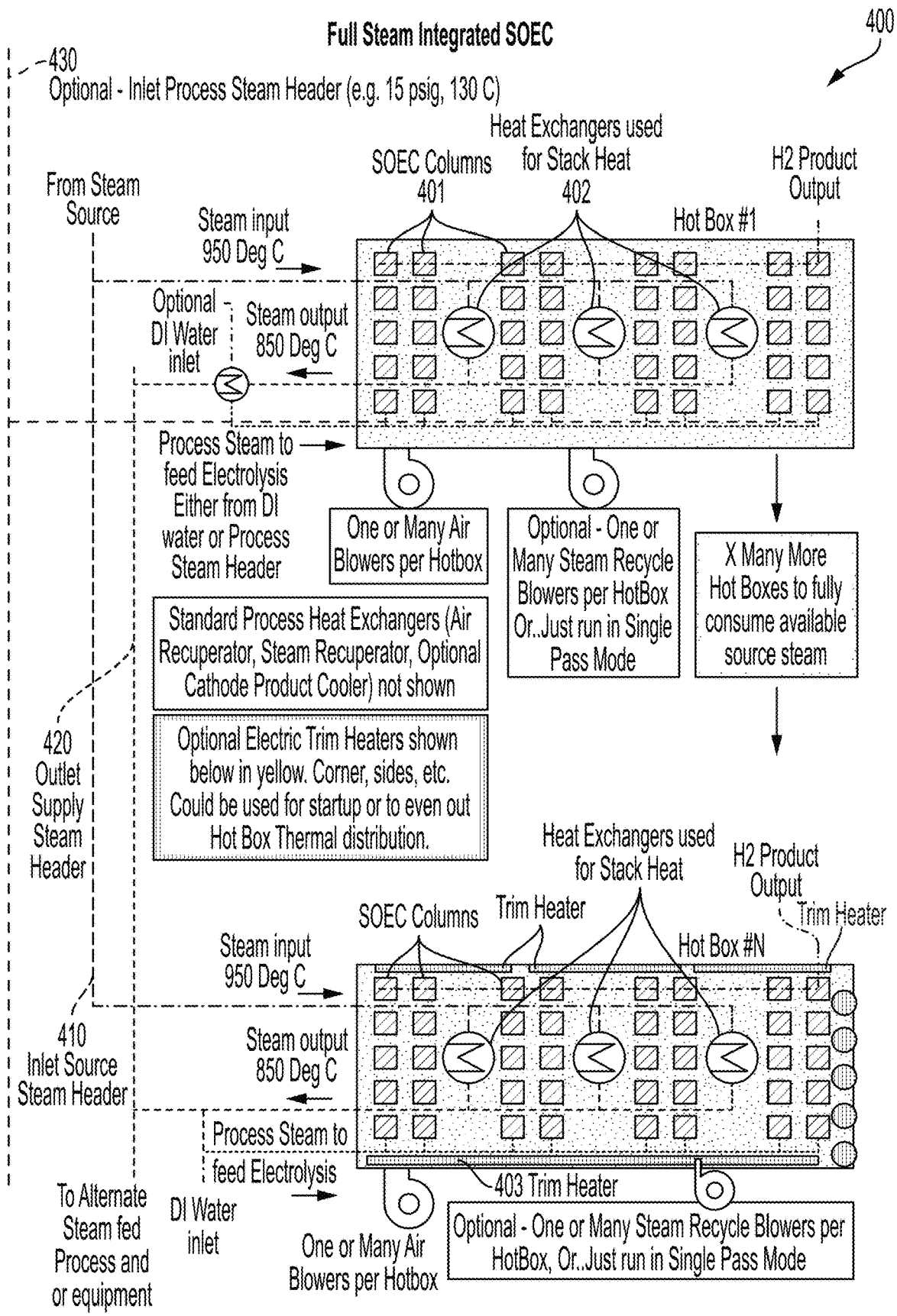
FIG. 4 illustrates a large site electrolyzer system having SOEC columns that are integrated with steam according to an example embodiment of the present invention.

FIG. 4 illustrates a large site electrolyzer system 400 having SOEC columns that are integrated with steam according to an example embodiment of the present invention.

The embodiments of the invention provide systems, devices, and methods for electrolysis at very large scale (e.g., exceeding 100 megawatts (MW), and at gigawatt (GW) scale). The embodiments of the present invention provide integration of SOECs with ultrahigh temperature steam to minimize electrical power consumption per kg of $H_2$. In other words, large-scale electrolysis with minimal power consumption is provided.

To achieve such very large scale, a significantly larger hotbox may be used. As illustrated in FIG. 4, for example, a hotbox (e.g., hotbox 1 . . . hotbox N) containing 40 columns 401 (i.e., SOEC columns or stacks) may be used, but various configurations including varying numbers of columns may be used. In the various configurations, the hotbox may be somewhat smaller (e.g., 6, 8, 10, 20 SOEC columns) or substantially larger (e.g., 60, 80, or 100s of SOEC columns).

The SOEC columns are integrated with steam generated onsite (e.g., inlet source steam header 410). By using onsite steam generation, the total electrical power required per kg/hr of $H_2$ production is reduced. Onsite steam generation is at the site (e.g., customer site) of the hotbox. The one or more heat exchangers 402 are configured to partially or fully replace the existing air heaters, stack heaters and/or steam heaters used in smaller scale implementations.

Each internal heat exchanger 402 receives superheated steam (e.g., approximately 950° C., approximately between 900-950° C., approximately 925° C. or more), and extracts sensible heat to heat the SOEC columns. In addition, the internal heat exchangers 402 output steam at a lower temperature (e.g., approximately 850° C., approximately between 800-850° C.) to outlet supply steam header 420. This lower temperature (850° C.) output steam may be used for other process equipment, or could be returned to the source for reheating and repressurization to the original temperature (950° C.) and pressure. In other words, the lower temperature (850° C.) output steam may be recycled.

In some configurations, each internal heat exchanger 402 receives superheated steam at a temperature that is relative to (e.g., higher than) the operating temperature of the SOEC columns (e.g., approximately 25° C., 50° C., 75° C., 100° C., 150° C., 250° C. higher than the operating temperature of the SOEC columns which can be approximately 650° C., 700° C., 750° C., 800° C., 850° C.). Here the lower output temperature is approximately the operating temperature of the SOEC columns or slightly higher.

In general, the larger the hotbox configuration, the lower the heat loss to ambient in kW per kg/hr of $H_2$ capacity. Although the embodiment illustrated in FIG. 4 shows a rectangular configuration, heat loss to ambient may be further minimized by varying the hotbox layout. For example, the hotbox may be configured as having a square or circular layout or footprint. Additionally, the hotbox itself can be configured as multi-story (i.e., using taller SOEC columns) to further reduce heat loss to ambient in KW per kg/hr of $H_2$ capacity.

In some instances, the large profile of the hotbox may make it difficult to maintain thermal uniformity. Here, it may be preferable utilize optional small electrical trim heaters. Trim heaters may be located within the hotbox or at the periphery (e.g., edges/corners) of the hotbox, as illustrated by trim heater 403 in hotbox N.

One or more of a variety of methods may provide process steam (i.e., the steam fed to SOEC columns). For example, a low temperature header from the steam source (e.g., 15 psig, 130 C) may be used (e.g., inlet process steam header 430). In another example, deionized (DI) water is vaporized with heat exchange from the exiting 850 C steam. In yet another example, DI water is mixed with exiting 850° C. steam to yield a mixture at the right temperature and/or pressure. Here, high purity steam may be used for its sensible heat. Additionally, or alternatively, process steam may be recycled. In embodiments in which process steam is not recycled, a lower overall steam utilization results.

Although not depicted, standard process heat exchangers (e.g., air recuperator, steam recuperator, optional cathode product cooler, etc.) also may be used. The standard process heat exchangers may be disposed in a variety of locations including possibly in a "warm box" adjacent to the periphery (e.g., edge or corner) of the hotbox. It will be apparent to those skilled in the art that various modifications and variations can be made in the SOEC integration with ultra hot steam of the present invention without departing from the spirit or scope of the invention. Thus, it is intended that the present invention cover the modifications and variations of this invention provided they come within the scope of the appended claims and their equivalents.

What is claimed is:

1. A method of operating a solid oxide electrolyzer cell (SOEC) system comprising:
   providing a hotbox housing one or more SOEC columns and one or more heat exchangers;
   providing superheated steam to the one or more-heat exchangers, the superheated steam having a temperature of 925° C. or more and that is greater than an operating temperature of the one or more SOEC columns; and
   using the one or more heat exchangers to heat the one or more SOEC columns by extracting heat from the superheated steam.

2. The method of operating a SOEC system of claim 1, further comprising utilizing one or more electric trim heaters to provide additional heat to the one or more SOEC columns to maintain thermal uniformity.

3. The method of operating a SOEC system of claim 2, wherein at least a subset of the one or more electric trim heaters is located at a peripheral location of the hotbox.

4. The method of operating a SOEC system of claim 1, wherein the one or more heat exchangers heat the one or more SOEC columns by extracting sensible heat from the superheated steam.

5. The method of operating a SOEC system of claim 1, further comprising providing process steam to the one or more SOEC columns from a steam source using a low temperature header.

6. The method of operating a SOEC system of claim 1, further comprising providing process steam to the one or more SOEC columns using water that is vaporized by steam output from the one or more heat exchangers.

7. The method of operating a SOEC system of claim 1, wherein the superheated steam has a temperature of approximately 950° C.

8. The method of operating a SOEC system of claim 1, wherein the superheated steam has a temperature that exceeds 925° C. and the operating temperature of the one or more SOEC columns ranges from 650 to 850° C.

9. The method of operating a SOEC system of claim 1, wherein steam output from the heat exchangers is output from the hotbox.

10. The method of operating a SOEC system of claim 9, wherein the steam output from the hotbox is returned to the hotbox and is provided to the one or more SOEC columns to generate hydrogen.

11. The method of operating a SOEC system of claim 1, wherein:
   the one or more SOEC columns comprise a first SOEC column, a third SOEC column, and a second SOEC column located between the first SOEC column and the third SOEC column;
   the one or more heat exchangers comprise a first heat exchanger located between the first SOEC column and the second SOEC column, and a second heat exchanger located between the second SOEC column and the third SOEC column; and
   the input steam exiting the second heat exchanger is directed toward the first SOEC column.

12. A method of operating a solid oxide electrolyzer cell (SOEC) system comprising:
   operating SOEC columns located in a hotbox at an operating temperature to generate hydrogen after the step of starting up operation of the SOEC columns;
   providing superheated steam to a heat exchanger located in the hotbox, the superheated steam having a temperature of 925° C. or more and that is greater than the operating temperature of the SOEC columns, the heat exchanger outputting process steam;
   heating the SOEC columns using sensible heat extracted from the superheated steam in the heat exchanger; and
   recycling the process steam output from the heat exchanger to the SOEC columns to generate the hydrogen.

13. The method of claim 12, wherein the step of heating the SOEC columns using sensible heat comprises heating air inside of the hotbox using heat extracted from the superheated steam in the heat exchanger to heat the SOEC columns.

14. The method of claim 12, wherein the step of recycling the process steam comprises:
   outputting the process steam from the hotbox;
   vaporizing water by heat exchange with the process stream outside the hotbox; and returning the process stream to the SOEC columns located in the hotbox.

15. The method of claim 12, wherein the operating temperature of the SOEC columns ranges from 650 to 850° C.

* * * * *